(12) United States Patent
Chen et al.

(10) Patent No.: US 7,492,429 B2
(45) Date of Patent: Feb. 17, 2009

(54) IN-PLANE SWITCHING LIQUID CRYSTAL DISPLAY WITH BENT ELECTRODES

(75) Inventors: Chueh-Ju Chen, Miao-Li (TW); Chiu-Lien Yang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 299 days.

(21) Appl. No.: 11/092,203

(22) Filed: Mar. 28, 2005

(65) Prior Publication Data
US 2005/0213013 A1   Sep. 29, 2005

(30) Foreign Application Priority Data
Mar. 26, 2004  (TW) .............................. 93108268 A (51) Int. Cl.
*G02F 1/1343* (2006.01)
(52) U.S. Cl. ....................... 349/141; 349/146
(58) Field of Classification Search ................ 349/141, 349/143, 145–146, 139
See application file for complete search history.

(56) References Cited
U.S. PATENT DOCUMENTS
6,618,109 B2 *   9/2003   Hidehira et al. .............. 349/141

* cited by examiner

*Primary Examiner*—Dung T. Nguyen
(74) *Attorney, Agent, or Firm*—Wei Te Chung (57) ABSTRACT

An in plane switching liquid crystal display (2) includes a first substrate (27), a second substrate (37) and a liquid crystal layer (23) having a plurality of liquid crystal molecules. A number of pixel electrodes (25) and common electrodes (24) are formed on the first substrate, and each of the pixel electrodes and common electrodes include at least two bend portions (241, 242, 243). Each bend portion has a first side and a second side. An original alignment direction of the liquid crystal molecules form at least two different angles with the sides of the bend portions of the common and pixel electrodes. When a voltage is applied to the pixel electrodes and the common electrodes, the liquid crystal molecules are aligned along at least three different directions. Therefore, the IPS-LCD can have uniform viewing performance at different viewing angles.

18 Claims, 9 Drawing Sheets

IN-PLANE SWITCHING LIQUID CRYSTAL DISPLAY WITH BENT ELECTRODES

BACKGROUND OF THE INVENTION

1. Field of the Invention

The present invention relates to in plane switching liquid crystal displays, and particularly to an in plane switching liquid crystal display which can provide uniform viewing performance at different viewing angles.

2. General Background

Liquid crystal displays (LCDs) are typically used as the information display in various devices such as computers and vehicle and airplane instrumentation. One type of LCD called the twisted nematic liquid crystal display (TN-LCD) often has the drawback of a narrow range of viewing angles. Thus an improved design called the in plane switching liquid crystal display (IPS-LCD) has been developed in order to provide a broad range of viewing angles. The IPS-LCD typically has a plurality of common electrodes and a plurality of pixel electrodes all disposed on a same substrate of two opposite substrates, for driving liquid crystal molecules contained in a liquid crystal layer between the two substrates The resulting electric field is substantially planar and parallel to surfaces of both substrates. The IPS-LCD typically has a broad range of viewing angles.

Figure 7:
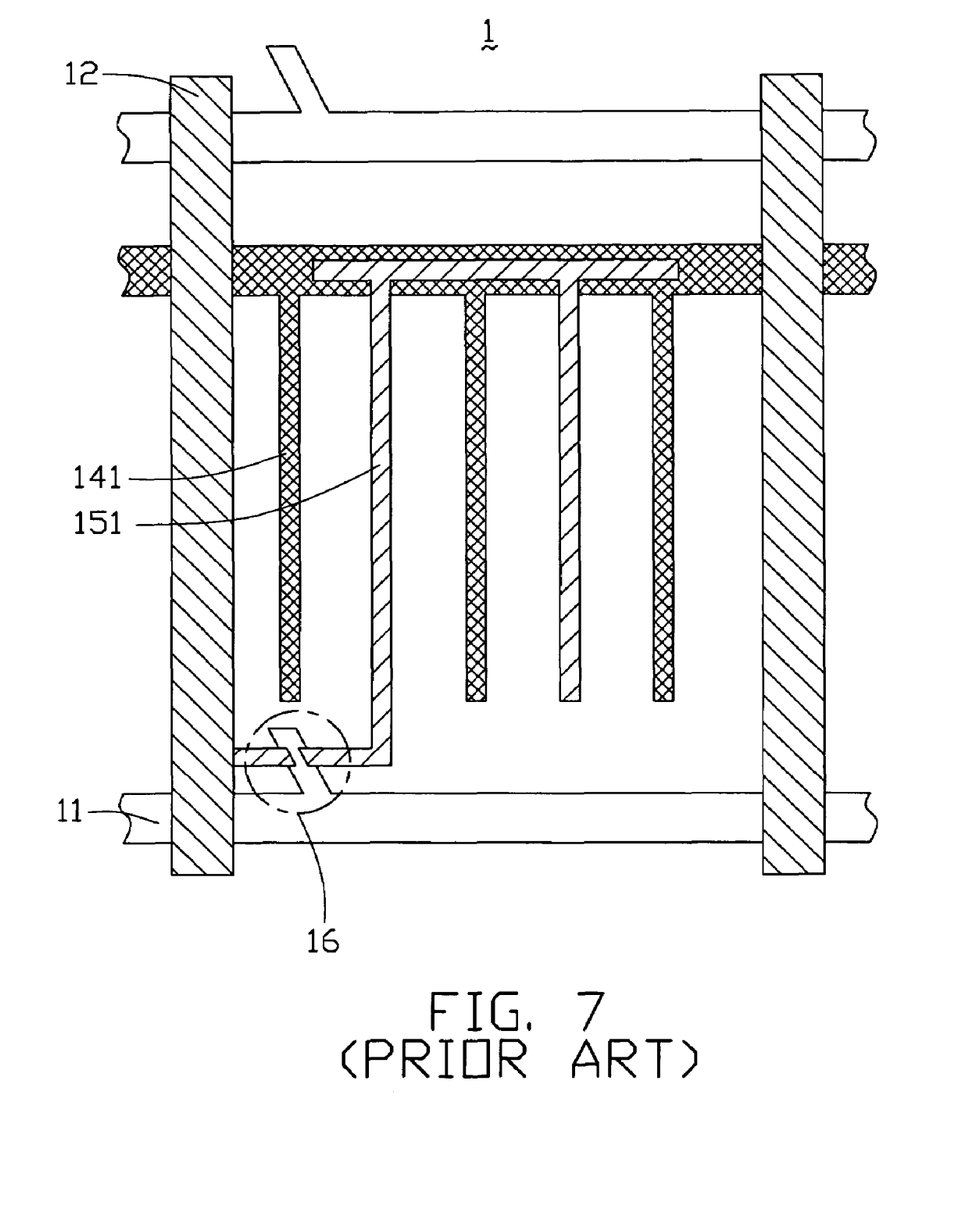
FIG. 7 is a top plan view of a pixel area of a conventional IPS-LCD.

According to the particular electrode array of its pixel electrodes and common electrodes, an IPS-LCD is classified as a single-domain type or a two-domain type. FIG. 7 is a top plan view showing an electrode array of a pixel area of a conventional single-domain IPS-LCD 1. Two parallel gate lines 11 are orthogonal to two parallel data lines 12, thereby defining the rectangular pixel area. A thin film transistor 16, a plurality of common electrodes 141, and a plurality of pixel electrodes 151 are formed in the pixel area. The common electrodes 141 and the pixel electrodes 151 are strip-shaped, and are arranged parallel to each other in alternating fashion. When a voltage is applied to the common electrodes 141 and the pixel electrodes 151, a horizontal electric field is produced therebetween. Long axes of the liquid crystal molecules are aligned parallel to the direction of the electric field. As a result, an amount of light passing through a liquid crystal layer (not shown) to display images can be controlled.

However, the conventional single-domain type IPS-LCD 1 has the following problem. Since the common electrodes 141 and the pixel electrodes 151 are all strip-shaped, the electric field is distributed along one direction only. When the displayed image is viewed at different oblique angles, an observer can frequently notice a quite large color shift.

Figure 8:
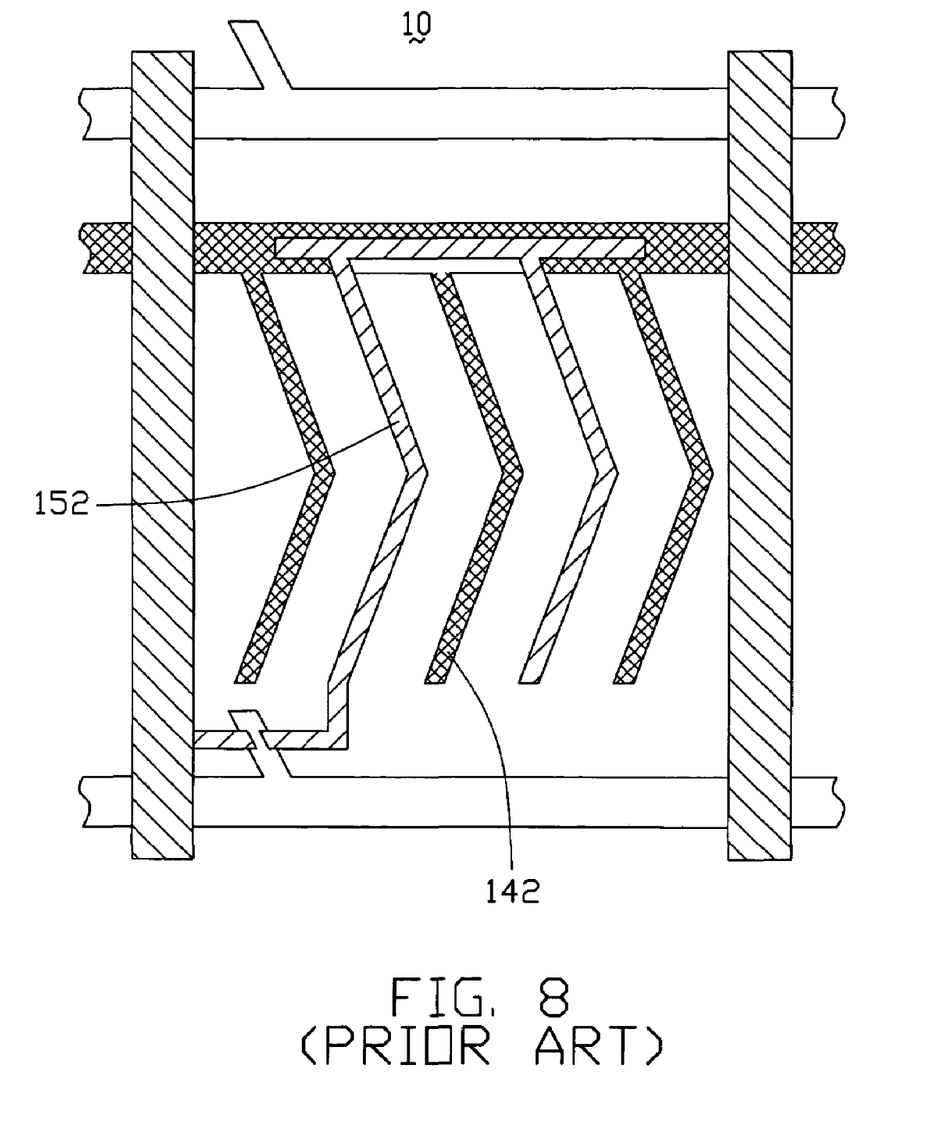
FIG. 8 is a top plan view of a pixel area of another conventional IPS-LCD.
Figure 9:
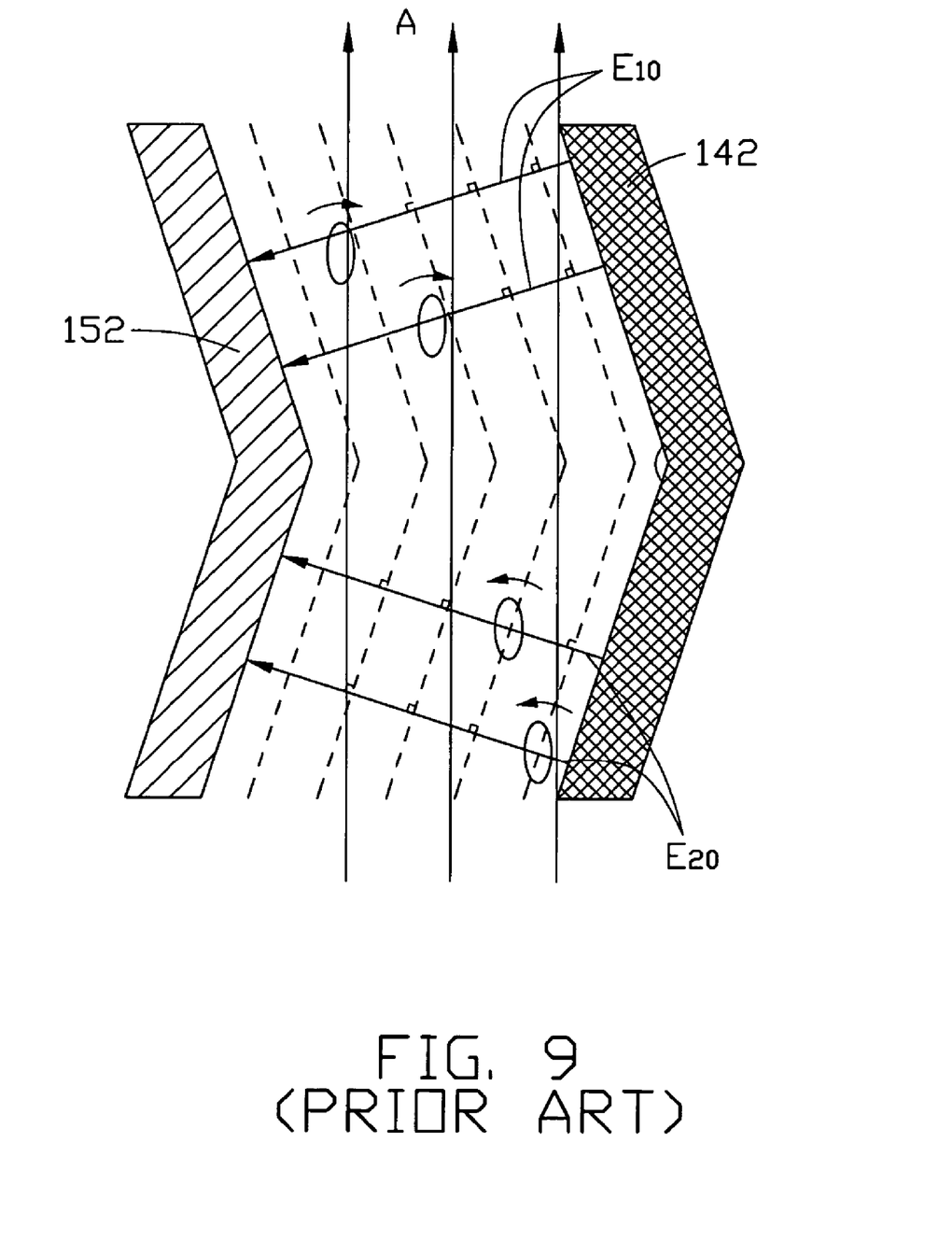
FIG. 9 is an enlarged view of a pixel electrode and a common electrode of the IPS-LCD of FIG. 8, showing directions of two electric fields when a voltage is applied to the pixel and common electrodes.

In order to solve the above-mentioned problem, the two-domain type IPS-LCD has been developed. FIG. 8 is a top plan view showing an electrode array of a pixel area of a conventional two-domain type IPS-LCD 10. Common electrodes 142 and pixel electrodes 152 are designed to have a bent shape in the pixel area. Referring to FIG. 9, when no voltage is applied to the common electrodes 142 and the pixel electrodes 152, the liquid crystal molecules are aligned along a direction A. When a voltage is applied to the common electrodes 142 and the pixel electrodes 152, two electric fields $E_{10}$ and $E_{20}$ having two different directions are generated between the pixel electrodes 152 and the common electrodes 142. Accordingly, liquid crystal molecules are rotated in two different directions to form two light transmission regions in the one pixel area. The IPS-LCD 10 exhibits a two-domain display effect. As a result, different colors can be seen in the two regions when the display screen is obliquely viewed. Since the colors compensate for each other, the color shift in the two-domain type IPS-LCD 10 is reduced.

However, the two-domain electrode configuration of the IPS-LCD 10 still inherently limits the display thereof. Even better visual performance at various different viewing angles is desired.

What is needed, therefore, is an IPS-LCD which has fine viewing characteristics in different viewing directions.

SUMMARY

An IPS-LCD includes a first substrate and a second substrate disposed opposite each other and spaced apart a predetermined distance. A liquid crystal layer having a plurality of liquid crystal molecules is interposed between the first substrate and the second substrate. A plurality of gate lines and data lines are formed on the first substrate, to define a plurality of pixel areas. A plurality of pixel electrodes and common electrodes are formed on the first substrate, each of the pixel electrodes and the common electrodes includes a plurality of bend portions, each of the bend portions has a first side and a second side. The first sides and the second sides are along at least three different directions.

When a voltage is applied to the pixel electrodes and the common electrodes, the liquid crystal molecules are aligned along at least three different directions. Accordingly, each pixel area is divided into at least three different regions each having a respective viewing characteristic. The IPS-LCD has good visual performance at various different viewing angles.

Other advantages and novel features of the present invention will become more apparent from the following detailed description when taken in conjunction with the accompanying drawings, in which:

DETAILED DESCRIPTION OF PREFERRED EMBODIMENTS

Figure 1:
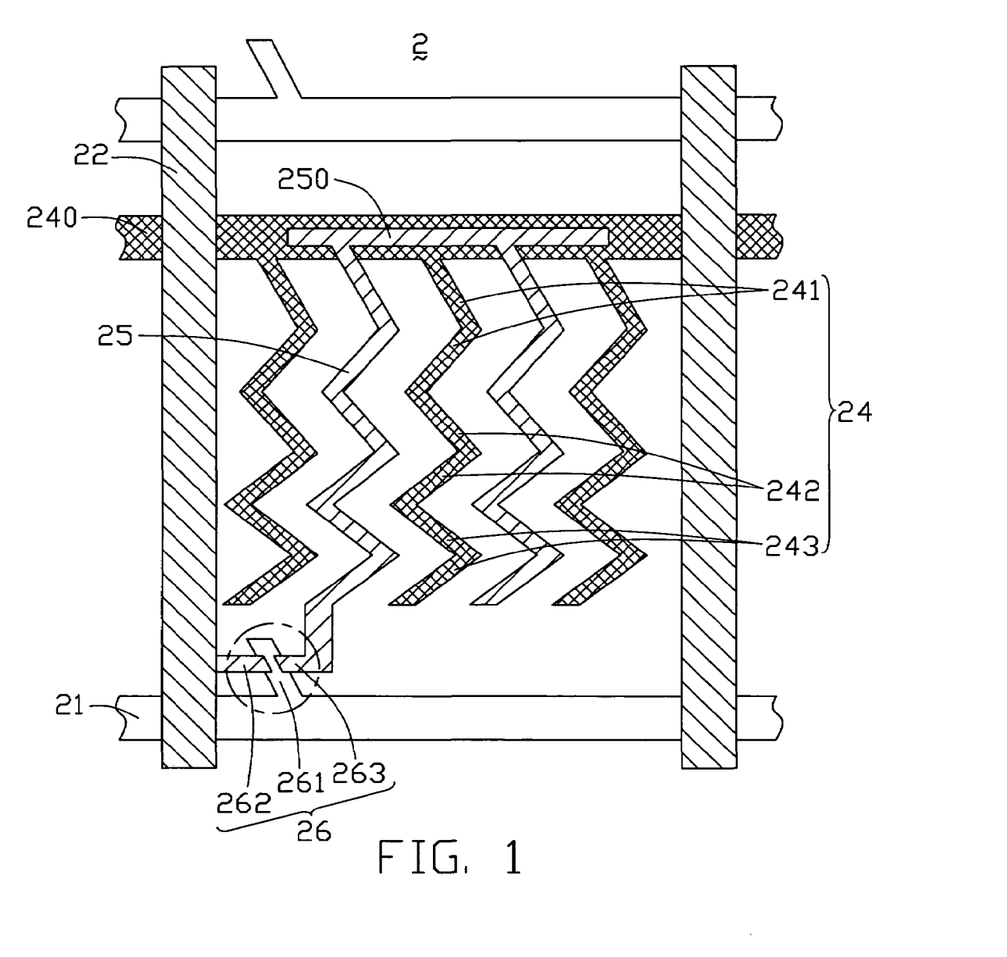
FIG. 1 is a top plan view of a pixel area of an IPS-LCD according to a first embodiment of the present invention.
Figure 2:
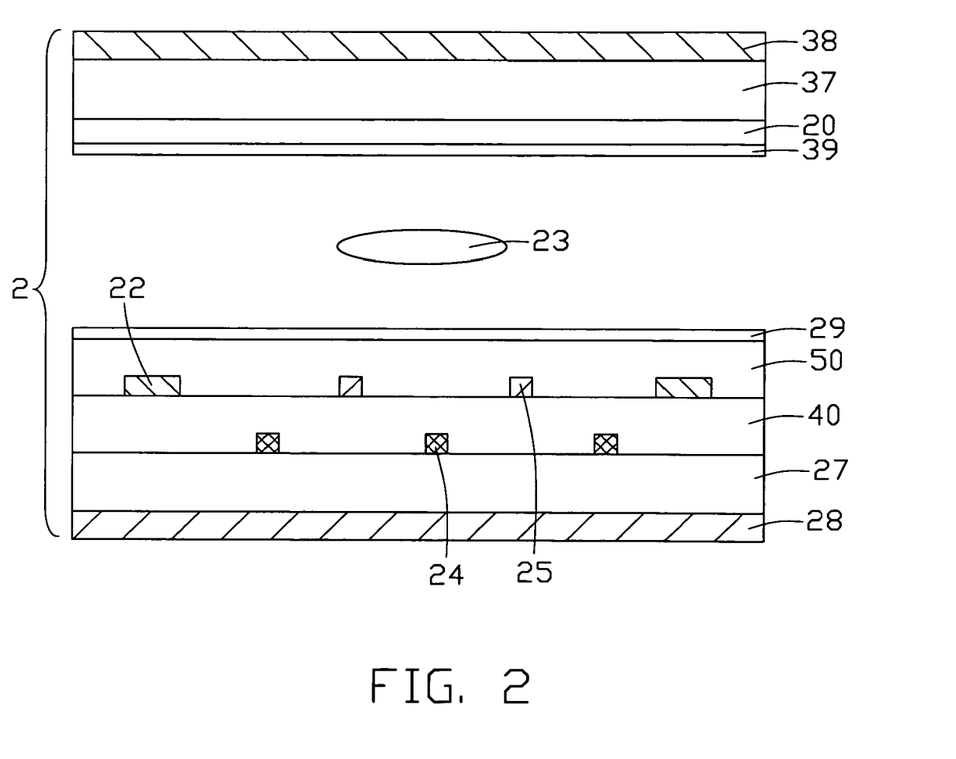
FIG. 2 is a schematic, side cross-sectional view of the IPS-LCD of FIG. 1, showing a portion corresponding to the pixel area thereof.

Referring to FIGS. 1-2, an IPS-LCD 2 of a first embodiment of the present invention includes a first substrate 27, a second substrate 37, and a liquid crystal layer 23 having a plurality of liquid crystal molecules. The first substrate 27 and the second substrate 37 are spaced apart from each other, and the liquid crystal layer 23 is disposed therebetween.

A color filter 20 and an alignment film 39 are formed on an inner surface of the second substrate 37 in that order from top to bottom, and a polarizer 38 is attached on an outer surface of the second substrate 37.

A polarizer 28 is attached on a lower surface of the first substrate 27. A polarizing axis of the polarizer 28 is perpendicular to that of the polarizer 38. A plurality of common electrodes 24 and a plurality of pixel electrodes 25 are formed at the first substrate 27, with an insulating layer 40 disposed between the common electrodes 24 and the pixel electrodes 25. A plurality of data lines 22 are formed on the insulating layer 40. A passivation layer 50 is coated on the insulating layer 40, and covers the data lines 22 and the pixel electrodes 25. An alignment film 29 is formed on the passivation layer 50, for orientating the liquid crystal molecules. The insulating layer 40 and the passivation layer 50 are made of silicon dioxide ($SiO_2$) or silicon nitride (SiNx).

A plurality of gate lines 21 and a plurality of the data lines 22 are cross-arranged on an inner surface of the first substrate 27, thereby defining a plurality of pixel areas. Each pixel area comprises a thin film transistor 26 disposed at an intersection of one of the gate lines 21 and one of the data lines 22. The thin film transistor 26 comprises a gate electrode 261, a source electrode 262 and a drain electrode 263, which are connected to the gate line 21, the data line 22 and the pixel electrode 25 respectively. Each pixel area further comprises a common electrode bus line 240 connected to the common electrode 24, and a pixel electrode bus line 250 connected to the pixel electrode 25.

The common electrode bus line 250 and the gate line 21 are formed at a same level parallel to each other. The pixel electrode bus line 250 is formed above the common electrode bus line 240, and covers part of the common electrode bus line 240. A storage capacitor is defined between the pixel electrode bus line 250 and the part of the common electrode bus line 240 which is covered by the pixel electrode bus line 250.

The common electrodes 24 are zigzagged, and extend obliquely at a same angle from the common electrode bus line 240. Each common electrode 24 comprises a first bend portion 241, a second bend portion 242 and a third bend portion 243 successively arranged end-to-end. The pixel electrodes 25 have a similar shape to the common electrodes 24, and extend obliquely at a same angle from the pixel electrode bus line 250. Thus the common and pixel electrodes 24 and 25 are arranged parallel to each other and in alternating fashion. The common and pixel electrodes 24 and 25 are made of a transparent conductor, such as indium tin oxide (ITO) or indium zinc oxide (IZO). When a voltage is applied to the common electrodes 24 and the pixel electrodes 25, horizontal electric fields are produced therebetween. Long axes of the liquid crystal molecules are aligned parallel to the directions of the electric fields.

Figure 3:
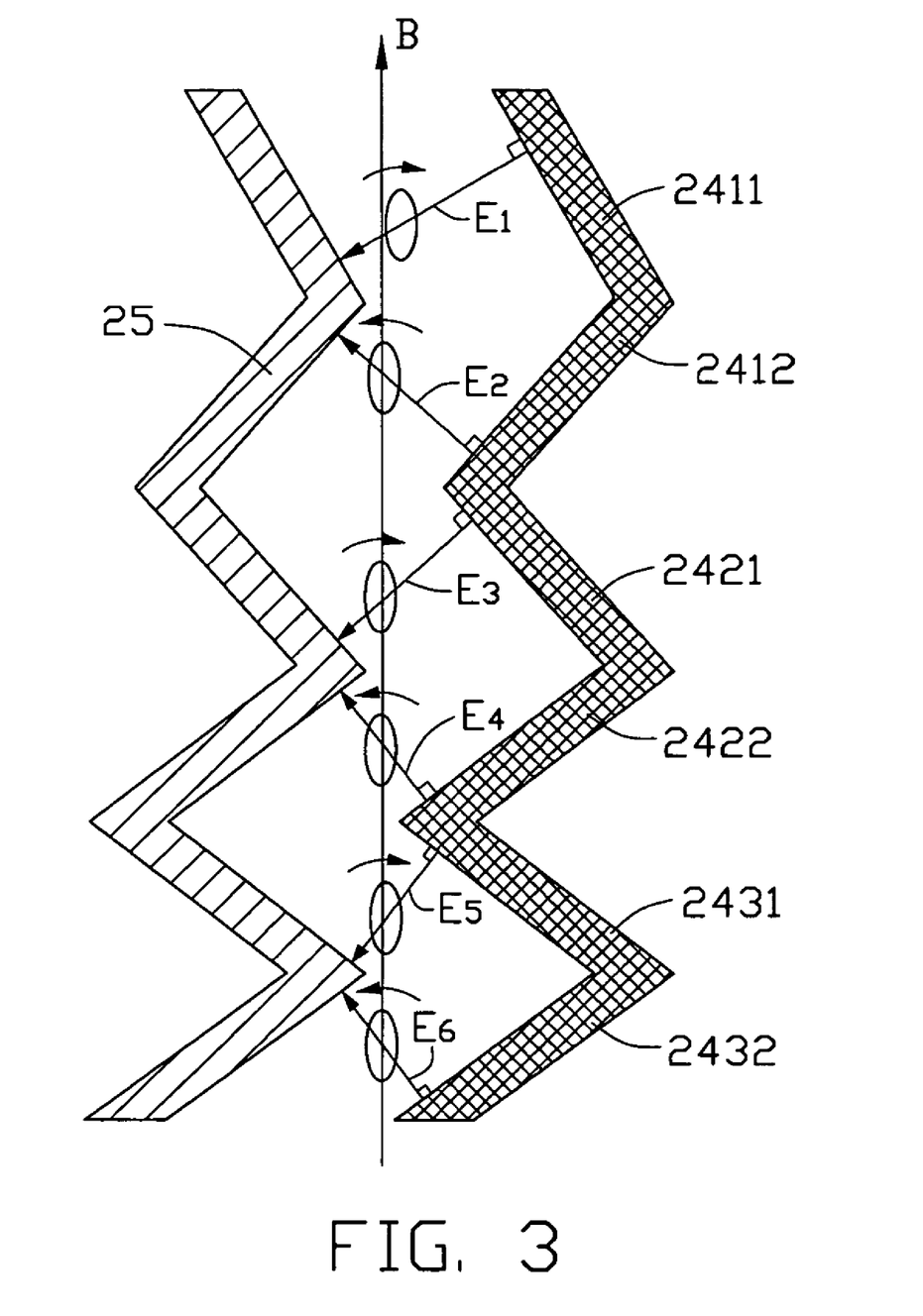
FIG. 3 is an enlarged view of a pixel electrode and a common electrode of the IPS-LCD of FIG. 1, showing directions of various electric fields when a voltage is applied to the pixel and common electrodes.

Referring to FIG. 3, the first bend portion 241, the second bend portion 242 and the third bend portion 243 comprise first sides 2411, 2421, 2431 and second sides 2412, 2422, 2432 respectively. All the first and second sides 2411, 2421, 2431, 2412, 2422, 2432 have a same length. The first sides 2411, 2421, 2431 are not parallel to each other, but instead are aligned along three slightly different directions. The second sides 2412, 2422, 2432 are not parallel to each other, but instead are aligned along three slightly different directions.

When no voltage is applied to the common electrodes 24 and the pixel electrodes 25, the liquid crystal molecules are aligned along an original direction as shown by arrow B under the effect of the alignment films 29 and 39. Since the first sides 2411, 2421, 2431 and the second sides 2412, 2422, 2432 are aligned along six different directions, they form six different angles with respect to the original alignment direction.

Thus when a voltage is applied to the common electrodes 24 and the pixel electrodes 25, six electric fields E1, E2, E3, E4, E5, E6 along six different directions are produced between the common electrodes 24 and the pixel electrodes 25. The electric fields E1, E3, E5 define acute angles with respect to arrow B, and the electric fields E2, E4, E6 define obtuse angles with respect to arrow B. Accordingly, the electric fields E1, E3, E5 drive the liquid crystal molecules to rotate clockwise, and the electric fields E2, E4, E6 drive the liquid crystal molecules to rotate counterclockwise. As a result, the liquid crystal molecules are aligned along six different directions. That is, each pixel area is divided into six regions, each having respective viewing characteristics. Therefore, the IPS-LCD 2 provides fine visual performance at various different viewing angles.

In an alternative embodiment, the data lines 22 can have a zigzagged shape, comprising three bend portions corresponding to the three bend portions 241, 242, 243 of the common electrodes 24 respectively.

Figure 4:
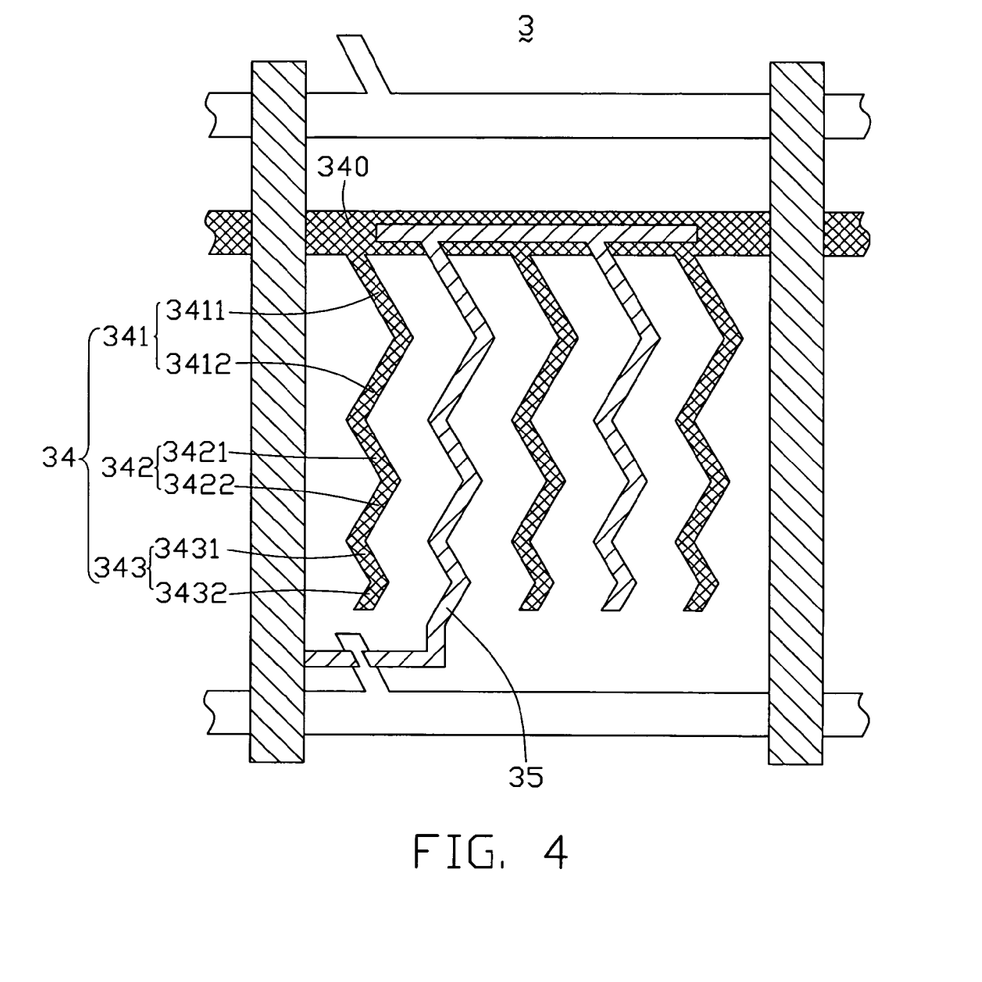
FIG. 4 is a top plan view of a pixel area of an IPS-LCD according to a second embodiment of the present invention.

Referring to FIG. 4, an IPS-LCD 3 of a second embodiment of the present invention is similar to the IPS-LCD 2 of the first embodiment. A common electrode 34 comprises a first bend portion 341, a second bend portion 342 and a third bend portion 343, each of which has a first and a second side. Lengths of first sides 3411, 3421, 3431 of the three bend portions 341, 342, 343 progressively decrease from a common electrode bus line 340. The second sides 3412, 3422, 3432 have same lengths as the first sides 3411, 3421, 3431 respectively. The first sides 3411, 3421, 3431 are all aligned along a first direction. The second sides 3412, 3422 are both aligned along a second direction, and the second side 3432 is aligned along a third direction. The pixel electrodes 35 have essentially the same shape as the common electrodes 34.

When no voltage is applied to the common electrodes 34 and the pixel electrodes 35, the liquid crystal molecules have a same orientation. When a voltage is applied to the common electrodes 34 and the pixel electrodes 35, three electric fields (not labeled) along three different directions are produced. As a result, the liquid crystal molecules are aligned along three different directions. That is, each pixel area is divided into three regions, each having respective viewing characteristics. Therefore, the IPS-LCD 3 provides fine visual performance at various different viewing angles.

Figure 5:
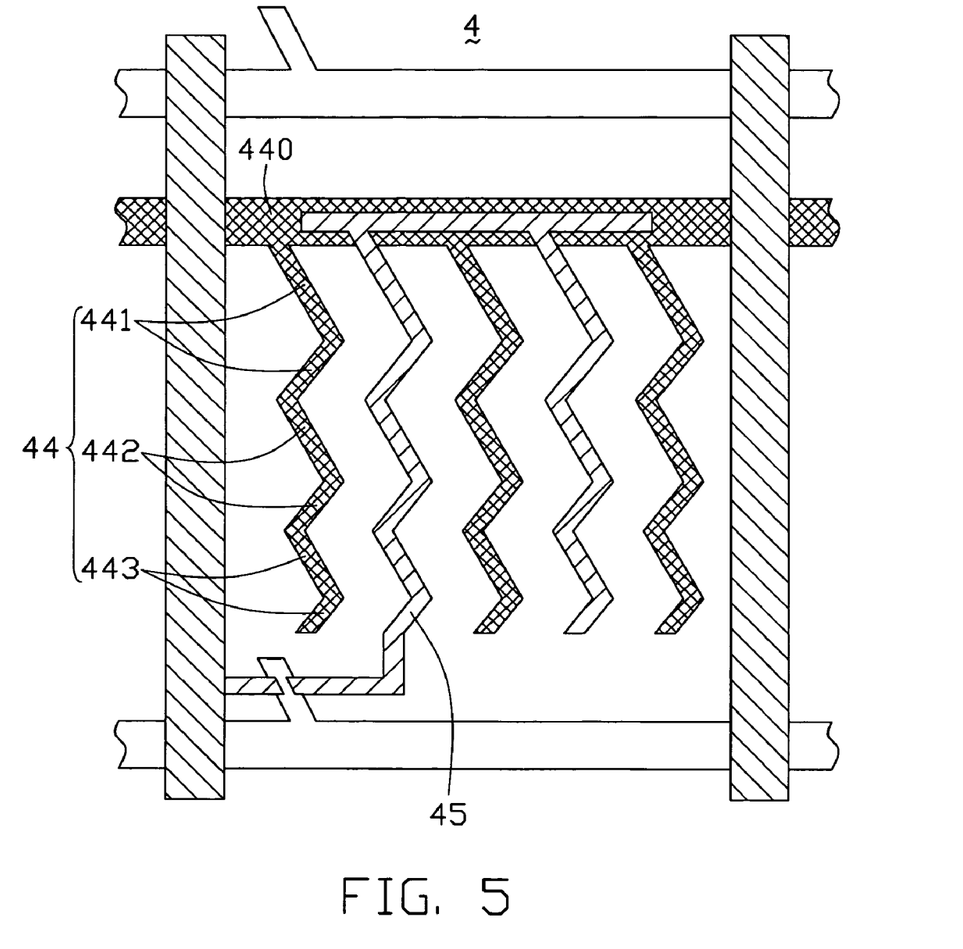
FIG. 5 is a top plan view of a pixel area of an IPS-LCD according to a third embodiment of the present invention.

Referring to FIG. 5, an IPS-LCD 4 of a third embodiment of the present invention is similar to the IPS-LCD 3 of the second embodiment. A common electrode bus line 440 connects common electrodes 44. Each of common electrodes 44 has first, second and third bend portions 441, 442, 443. First sides (not labeled) of the first, second and third bend portions 441, 442, 443 are all parallel to a first direction. Second sides (not labeled) of the first, second and third bend portions 441, 442, 443 are aligned along second, third and fourth directions respectively. Each of pixel electrodes 45 has the same shape as the common electrodes 44. The IPS-LCD 4 has a four-domain display effect, and therefore can provide even finer visual performance at various different viewing angles compared with the IPS-LCD 3. The length of the first sides and the second sides of the first, second and third bend portions 441, 442, 443 decreases gradually with increasing distance away from the common electrode bus line 440.

Figure 6:
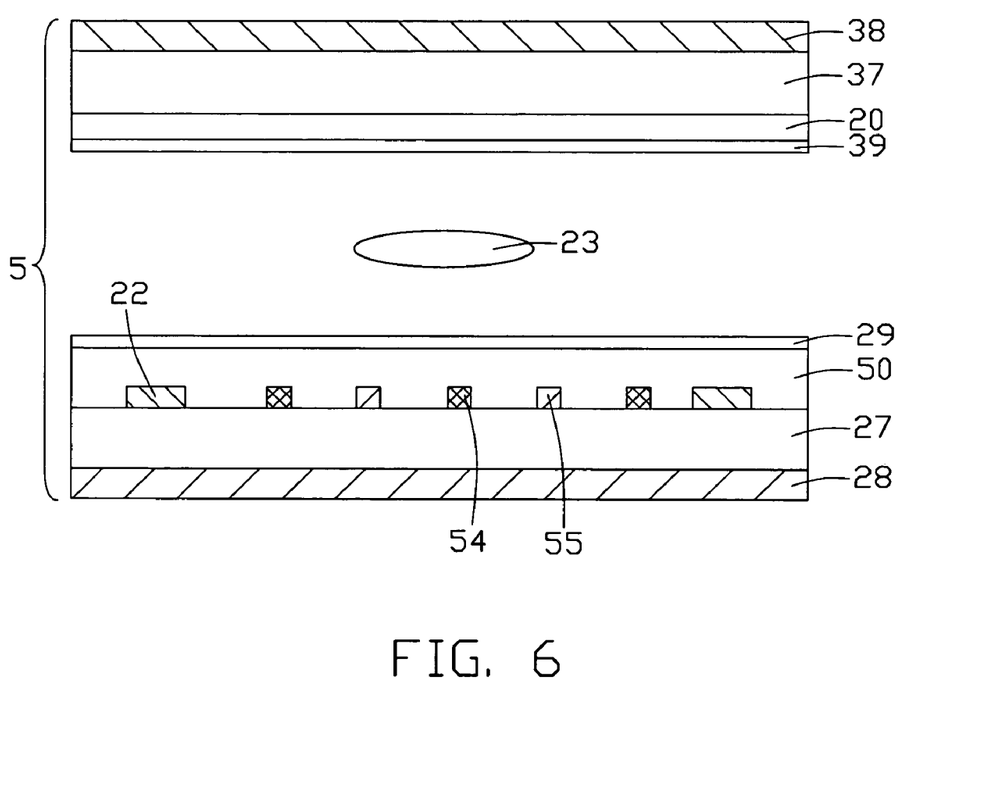
FIG. 6 is a schematic, side cross-sectional view of a pixel area of an IPS-LCD according to a fourth embodiment of the present invention.

Referring to FIG. 6, an IPS-LCD 5 of a fourth embodiment of the present invention is similar to the IPS-LCD 2 of the first embodiment. However, in the IPS-LCD 5, common electrodes 54 and pixel electrodes 55 are formed at a same level, in order to generate true in-plane electric fields. Other components like the polarizers 28 and 38, the substrates 27 and 37, the alignment films 29 and 39, and the color filter 20 and the passivation layer 50 are disposed in the same way as in the IPS-LCD 2.

In further alternative embodiments of the present invention, an IPS-LCD can be appropriately structured so that electric fields generated between the pixel electrodes and the common electrodes are aligned along 5 different desired directions, 7 different desired directions, or another desired number of desired different directions.

It is to be understood, however, that even though numerous characteristics and advantages of the various embodiments have been set forth in the foregoing description, together with details of the structures and functions of the embodiments, the disclosure is illustrative only, and changes may be made in detail, especially in matters of shape, size, equivalent material and arrangement of parts within the principles of the invention to the full extent indicated by the broad general meaning of the terms in which the appended claims are expressed.

What is claimed is:

1. An in plane switching liquid crystal display, comprising;
   a first substrate and a second substrate disposed opposite each other and spaced apart a predetermined distance;
   a liquid crystal layer having a plurality of liquid crystal molecules interposed between the first substrate and the second substrate;
   a plurality of gate lines and data lines formed on the first substrate, thereby defining a plurality of pixel areas; and
   a plurality of pixel electrodes and common electrodes formed at the first substrate, each of the pixel electrodes and the common electrodes comprising a plurality of bend portions, each of the bend portions having a first side and a second side;
   wherein the first sides and the second sides are aligned along at least three different directions, and the first sides have at least two have different lengths, and the second sides have at least two different lengths.

2. The in plane switching liquid crystal display as claimed in claim 1, wherein the pixel electrodes and the common electrodes each comprise three bend portions.

3. The in plane switching liquid crystal display as claimed in claim 2, wherein the first sides and the second sides of the three bend portions are aligned along six different directions.

4. The in plane switching liquid crystal display as claimed in claim 2, wherein the first sides and the second sides of the three bend portions are aligned along at least three different directions.

5. The in plane switching liquid crystal display as claimed, in claim 2, wherein the first sides and the second sides of the three bend portions are aligned along four different directions.

6. The in plane switching liquid crystal display as claimed in claim 1, wherein the first sides and the second sides have a same length.

7. The in plane switching liquid crystal display as claimed in claim 1, wherein the pixel electrodes and the common electrodes are formed at a same level.

8. The in plane switching liquid crystal display as claimed in claim 1, wherein the pixel electrodes are formed at a level different from a level at which the common electrodes are formed.

9. An in plane switching liquid crystal display, comprising:
   a first substrate and a second substrate disposed opposite each other and spaced apart a predetermined distance;
   a liquid crystal layer having a plurality of liquid crystal molecules interposed between the first substrate and the second substrate;
   a plurality of gate lines and data lines formed at the first substrate, thereby defining a plurality of pixel areas;
   a plurality of pixel electrodes and common electrodes, each of the pixel electrodes and the common electrodes comprising a plurality of bend portions, each of the bend portions having a first side and a second side;
   wherein when the in plane switching liquid crystal display is in a driven state, electric fields aligned along at least three different directions are generated between the pixel and common electrodes in each pixel area, and the first sides have at least two have different lengths, and the second sides have at least two different lengths.

10. The in plane switching liquid crystal display as claimed in claim 9, wherein the pixel electrodes and the common electrodes each comprise three bend portions for generating the electric fields along the at least three different directions, and each of the three bend portions comprises a first side and a second side.

11. The in plane switching liquid crystal display as claimed in claim 10, wherein the first sides and the second sides of the three bend portions are aligned along six different directions.

12. The in plane switching liquid crystal display as claimed in claim 10, wherein the first sides and the second sides of the three bend portions are aligned along three different directions.

13. The in plane switching liquid crystal display as claimed in claim 10, wherein the first sides and the second sides of the three bend portions are aligned along four different directions.

14. The in plane switching liquid crystal display as claimed in claim 9, wherein the first sides and the second sides have a same length.

15. The in plane switching liquid crystal display as claimed in claim 9, wherein the pixel electrodes and the common electrodes are formed at a same level.

16. The in plane switching liquid crystal display as claimed in claim 9, wherein the pixel electrodes are formed at a level different from a level at which the common electrodes are formed.

17. A method of making an in plane switching liquid crystal display comprising:
    providing a first substrate and a second substrate disposed each other and spaced apart a predetermined distance;
    disposing a liquid crystal layer having a plurality of liquid crystal molecules interposed between the first substrate and the second substrate;
    providing a plurality of gate lines and data lines formed at the first substrate, thereby defining a plurality of pixel areas;
    providing a plurality of pixel electrodes and common electrodes, each of the pixel electrodes and the common electrodes comprising a plurality of bend portions, each of the bend portions having a first side and a second side;
    wherein when the in plane switching liquid crystal display is in a driven state, electric fields aligned along at least three different directions are generated between the pixel and common electrodes in each pixel area, and the first sides have at least two have different lengths, and the second sides have at least two different lengths.

18. The method as claimed in claim 17, wherein said electric fields aligned along said at least three different directions are derived from serpentine extensions of said pixel and common electrodes each with at least two reverse deflections.

* * * * *